United States Patent
Di Buono et al.

(10) Patent No.: US 9,575,200 B2
(45) Date of Patent: Feb. 21, 2017

(54) APPARATUS AND METHOD FOR NON-INVASIVE REAL-TIME SUBSOIL INSPECTION

(75) Inventors: Nicola Di Buono, Novara (IT); Edoardo Cottino, Zoccorino (IT)

(73) Assignee: SIRTI SPA, Milan (IT)

( * ) Notice: Subject to any disclaimer, the term of this patent is extended or adjusted under 35 U.S.C. 154(b) by 380 days.

(21) Appl. No.: 14/233,308

(22) PCT Filed: Jul. 20, 2011

(86) PCT No.: PCT/IB2011/001714
§ 371 (c)(1),
(2), (4) Date: Jan. 16, 2014

(87) PCT Pub. No.: WO2013/011341
PCT Pub. Date: Jan. 24, 2013

(65) Prior Publication Data
US 2014/0145723 A1    May 29, 2014

(51) Int. Cl.
*G01V 3/12* (2006.01)

(52) U.S. Cl.
CPC .................... *G01V 3/12* (2013.01)

(58) Field of Classification Search
CPC .... G01S 13/885; G01S 13/89; G01S 13/0209; G01S 13/88; G01V 3/12
USPC .................................................. 342/22, 329
See application file for complete search history.

(56) References Cited

U.S. PATENT DOCUMENTS

| | | | |
|---|---|---|---|
| 7,675,289 B1 | 3/2010 | Stolarczyk et al. | |
| 8,207,885 B2* | 6/2012 | Hibbard | G01S 13/106 342/137 |
| 2003/0043067 A1 | 3/2003 | Johansson et al. | |
| 2004/0210370 A1* | 10/2004 | Gudat | E02F 3/435 701/50 |
| 2005/0128125 A1 | 6/2005 | Li et al. | |
| 2008/0133128 A1* | 6/2008 | Koch | E02F 3/435 37/348 |
| 2009/0243916 A1* | 10/2009 | Beeri | G01S 7/20 342/179 |
| 2011/0115667 A1* | 5/2011 | Feigin | G01S 7/4008 342/22 |

FOREIGN PATENT DOCUMENTS

EP    2 085 794    8/2009

OTHER PUBLICATIONS

International Search Report for International Application No. PCT/IB2011/001714 mailed Jul. 5, 2012 (5 pages).

* cited by examiner

*Primary Examiner* — Timothy A Brainard
(74) *Attorney, Agent, or Firm* — Merchant & Gould P.C.

(57) ABSTRACT

An apparatus for non-invasive subsoil inspection used for verifying the presence of any underground facilities includes a mobile support structure (2) which can be moved in at least one horizontal direction and which supports antennas (A) adapted to transmit an electromagnetic signal towards the soil and to receive the response echoes. An electronic processing unit is adapted to analyze the data acquired by the antennas and to reconstruct an image of the subsoil portion scanned by the machine.

15 Claims, 1 Drawing Sheet

APPARATUS AND METHOD FOR NON-INVASIVE REAL-TIME SUBSOIL INSPECTION

This application is a National Stage Application of PCT/IB2011/001714, filed 20 Jul. 2011 and which application is incorporated herein by reference. To the extent appropriate, a claim of priority is made to the above disclosed application.

BACKGROUND

The present invention relates to an apparatus and a method for non-invasive, real-time, three-dimensional subsoil inspection.

SUMMARY

In particular, the present invention relates to a radar subsoil inspection apparatus used for verifying the presence of objects, such as pipes, conduits in general, cables or metal structures, in ducts time.

Machines of this type are used in the art, for example, whenever it is necessary to verify if there are any pipes, cables or the like in the subsoil prior to making an excavation, e.g. in order to lay cables underground.

In such cases, a subsoil analysis is carried out prior to making the excavation; advantageously, said analysis is done by using non-invasive methods (e.g. through Georadar techniques), so as to verify if there are any underground facilities in the excavation area.

If the presence of sensitive items is ascertained, the points where such items are located and where it is not advisable to proceed with the excavation are then marked.

Excavations or channels adapted for laying one or more cables, e.g. electric or optical-fibre cables, are typically made on the road surface, e.g. on the roadside, or in some cases directly on the pavement. At this stage, especially in densely urbanized areas, the time necessary for completing the above-mentioned operations and the dimensions of the required machinery are extremely critical factors. In fact, the presence of a construction site, or anyway of large machines occupying the road surface, the roadside and the pavement, causes much discomfort to both pedestrians and vehicles in transit, which discomfort is directly proportional to the site area and to the duration of said excavation work.

Therefore, it is very important to be able to complete such work in the shortest time possible, especially in the light of the increased number of cable installations required by private people, companies or public bodies because of the massive diffusion of the latest multimedia technologies (whether using electric or optical-fiber cables).

Traditional detection machines are either driven by suitable motors or pushed manually, and are equipped with at least one electromagnetic-wave antenna and a data control/display unit, both of which are electrically powered. The acquired data can be visualized on a high-resolution display and may then be saved to an internal storage medium. A data processing program is used for displaying the underground objects detected.

The machine's operation is based on the reflection of electromagnetic waves sent into the ground through said antenna, the echoes (reflections) of which can be received by the very same antenna (monostatic radar) or at different locations (bistatic radar).

When analyzed, said reflections can indicate any discontinuities in the subsoil of the area under investigation, which may be due to either natural causes (soil stratification, cavities, piezometric surface) or external causes (buried objects, pipes, cables, cans, archeological finds, etc.). In the civil engineering field, this technique is successfully employed to find humidity in structures, to verify the stability of brick constructions (such as railway tunnels and viaducts), or for locating air gaps, electro-welded wire mesh, pipes, cables, etc.

Normally such prior-art machines are fitted with an antenna capable of analyzing a two-dimensional portion of the area under investigation.

The term "two-dimensional portion" refers herein to an analysis carried out in the direction of forward motion (X axis) of the antenna-equipped machine and to the return of echoes associated with the soil depth (Z axis).

In order to obtain a complete mapping of a three-dimensional portion of the subsoil (X, Y, Z) by means of a single antenna, it is necessary to subdivide the area and carry out a two-dimensional scan in each portion.

The inspection therefore requires several successive scans over the area in parallel portions thereof, and the antenna and the equipment making up the machine must be repositioned multiple times in order to carry out a two-dimensional sampling of this surface.

In general, the machine is moved in a main direction, thus obtaining a sampling along a single scan line. Subsequent scans then allow multiple parallel scan lines to be joined together to obtain a sampling of the examined surface.

In order to obtain a complete acquisition, patent IT138304 to the present Applicant employs an antenna associated with the machine's support structure through drive means, which cause it to move in a direction having at least one component perpendicular to the direction of forward motion of the machine itself.

As an alternative, when making only one pass over the area to be analyzed, the machine in use must be provided with a plurality of antennas having different polarizations, each performing one scan in one region. The entire set of regions constitutes the area to be analyzed; a simultaneous processing of all scans will then yield the overall three-dimensional image of the area scanned by the machine. It is apparent that this solution ensures shorter processing times, allowing for real-time visualization of any underground facilities.

The Applicant considered the problem of reconstructing a three-dimensional image in real time starting from such a matrix-type data acquisition.

One aspect of the present invention relates to a radar apparatus for non-invasive subsoil inspection.

BRIEF DESCRIPTION OF THE DRAWINGS

The features and advantages of the apparatus according to the present invention will become more apparent from the following non-limiting description provided by way of example with reference to the annexed schematic drawings, wherein.

DETAILED DESCRIPTION

Figure 1:
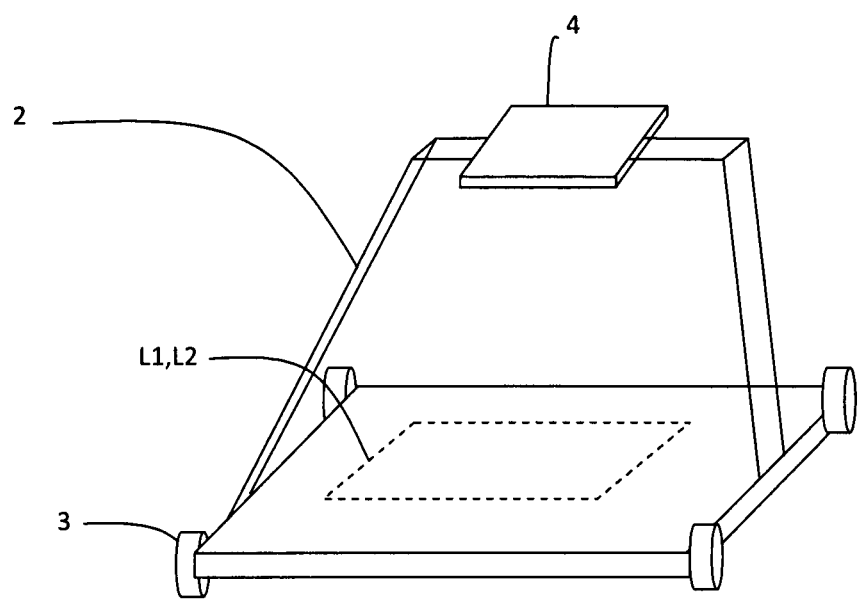
FIG. 1 is a schematic perspective view of an apparatus according to one embodiment of the present invention.
Figure 2:
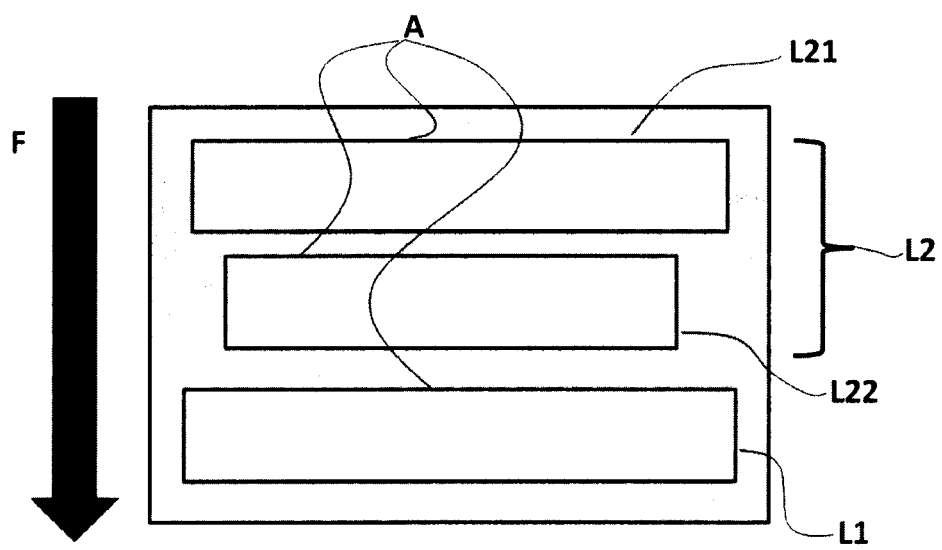
FIG. 2 shows one example of antenna layout.

With reference to the above-listed drawings, the apparatus according to the present invention comprises a mobile support structure 2, fitted with wheels 3 or similar devices adapted to cause it to move in at least one direction. Said structure may be moved manually (e.g. pushed by an operator), or else it may be fitted with a suitable motor, in which case the operator will only have steer the machine in the desired direction.

The apparatus also comprises a plurality of antennas A, divided into a group having vertical polarization V and another group having horizontal polarization H. Said antennas transmit the electromagnetic signal towards the soil and receive the response echoes. Suitable frequencies of said signal are in the range of 200 to 900 MHz. An electronic processing unit is adapted to analyze the data acquired by said antennas and to reconstruct an image of the subsoil portion scanned by the apparatus, which can then be displayed on a suitable display 4. Advantageously, said processing unit comprises a storage medium where both the antenna's measurements and the reconstructed images can be stored.

Said antennas carry out scans at predetermined spatial intervals (equivalent to time by constant forward velocity), so as to create a grid of scan points within a region.

Preferably, the machine further comprises a georeferencing device, which may, for example, be a GPS device, a total station, or a differential GPS device, which can associate the position according to the satellite coordinates, e.g. with each scan. Based on this information, the processing unit can reconstruct a map of the scanned area with georeferenced coordinates, which is useful for verifying the presence of any underground facilities. For the purposes of the present invention, the term "underground facilities" refers to all those underground items that must be monitored and signalled to the operators, such as pipes, cables, pits, drain wells, rocks, ducts, etc.

According to the present invention, said antennas are organized in groups; in particular, a first group of antennas L1 is adapted to detect transversal underground facilities, while a second group of antennas L2 is adapted to detect longitudinal underground facilities. The first group of antennas includes one row of antennas L1 with vertical polarization V for detecting any obstacles arranged transversally, preferably perpendicularly, to the direction of forward motion of the apparatus.

The second group of antennas L2 includes at least two rows of antennas L21 and L22, wherein the antennas in each row have horizontal polarization H, for detecting any obstacles arranged longitudinally with respect to the direction of forward motion of the apparatus.

Thus, for the purpose of finding any underground facilities arranged transversally to the excavation or cut to be made, the antennas of the first group receive substantially simultaneously the noise or anomalous return signal, which may indicate the presence of an underground facility. The underground facility is detected with certainty by cross-referencing, in this case following a pre-processing stage, when at least two adjacent antennas receive substantially the same signal, and is shown in real-time on the main screen of the aforementioned display. The fact that the antennas are organized into different groups allows to obtain a "three-dimensional" signal. This can then be processed to obtain a real-time orthogonal projection of the underground facilities on said display. Advantageously, the GPS position of the underground facility is saved.

As for the second group of antennas, they check the presence of a longitudinal underground facility in a substantially similar way, with the difference that the verification among the various antennas occurs between one or more antennas belonging to one row and those of the next row. In fact, the presence of a longitudinal underground facility is ascertained when the anomalous signal or noise is detected by at least one antenna in one row and at least one antenna in the next row. The inspection data can be transferred from the processing unit as files, e.g. CAD files, georeferenced maps (GIS, Geographic Interface System), or text files.

For all antennas, the detection occurs at the same instant. In particular, the processing unit receives the signals from all antennas simultaneously, processes it, and then returns an indication about the presence or absence of an underground facility in real time, in the three spatial planes.

In order to increase the reliability of the underground facility detection, processing unit 3 includes a program for determining the optimum speed of propagation of the echoes in the soil by the antennas.

Said program first requires the definition of a minimum value and a maximum value for the possible speeds of propagation. Subsequently, multiple scans executed over underground facilities at different scanning speeds will provide a set of values which, when reproduced on a graph, will take a parabolic shape.

The vertex of this parabola will correspond to the optimal value of the speed of propagation of the echoes by the antennas. This is done for each antenna. This step is then followed by the previously described acquisition and comparison step.

In short, the method of non-invasive subsoil inspection for verifying the presence of underground facilities according to the present invention comprises the following steps:
a) for each antenna, sending said electromagnetic signal towards the soil at different speeds of propagation within a predetermined range,
b) detecting the return echoes of said signals sent at different speeds,
c) for each antenna, selecting that speed of propagation for which the return echo is maximized,
d) comparing said maximum values of the return echoes among the various antennas.

Subsequently, the presence of the underground facility is detected and the latter is displayed in real time on said display.

The underground facility is highlighted by means of a target having a predetermined colour placed in the detected position.

The apparatus can also perform a non-invasive excavation assay through a plurality of parallel longitudinal passes, so as to scan a predefined area. The detections carried out at each pass are then compared with one another, and the unit can understand if the different passes partially overlapped and if the initial alignment for the next pass was incorrect. The unit then automatically corrects the redundant data resulting from overlapping or incorrect initial alignment. In the prior art, this problem was faced by using physical alignment supports, such as rubber strips or the like, corresponding to the path followed during one pass, which in the present invention are no longer required.

As an alternative, instead of verifying the presence of an underground facility, the "three-dimensional" scan allows monitoring the subsoil within a predefined area. In particular, it is possible to verify the stratigraphy of the scanned area through multiple passes as described above, thus identifying the composition thereof (asphalt, rock, sand or the like).

To this end, the identification algorithm may be implemented through a neural network which, once the self-learning process has been completed, allows discriminating among the various types of subsoil.

The invention claimed is:

1. Apparatus for non-invasive subsoil inspection, for verifying a presence of any underground facilities, comprising:
   a mobile support structure moveable in at least one horizontal direction, and which supports a plurality of antennas for transmitting an electromagnetic signal towards the soil and for receiving response echoes, and
   an electronic processing unit for analyzing the data acquired by said antennas and for reconstructing an image of the subsoil portion scanned by the machine, said antennas comprising:
      a first group of antennas including at least one row of antennas with vertical polarization, for detecting any underground facilities arranged transversely to a direction of forward motion of the apparatus,
      a second group of antennas including at least two rows of antennas with horizontal polarization, for detecting any underground facilities arranged longitudinally with respect to the direction of forward motion of the apparatus.

2. The apparatus according to claim 1, wherein the rows of antennas have vertical polarization for detecting any underground facilities orthogonal to the direction of forward motion of the apparatus.

3. The apparatus according to claim 1, further comprising a display for displaying said images of the scanned subsoil portion.

4. The apparatus according to claim 1, wherein said processing unit comprises a storage medium wherein both the measurements taken by the antennas and the reconstructed images can be stored.

5. The apparatus according to claim 1, further comprising a georeferencing device adapted to associate a position according to the satellite coordinates with each scan performed by the antennas.

6. The apparatus according to claim 1, wherein the detection is carried out at a same instant by all the antennas, and the processing unit receives the signals from all the antennas simultaneously and returns an indication of the presence or absence of an underground facility in real time, in the three spatial planes.

7. Apparatus according to claim 1, wherein said processing unit comprises an identification algorithm implemented through a neural network.

8. A process of using the apparatus according to claim 7, comprising conducting stratigraphic subsoil analyses.

9. Method of non-invasive subsoil inspection for verifying a presence of any underground facilities through an apparatus comprising a mobile support structure moveable in at least one horizontal direction and which supports a plurality of antennas for transmitting an electromagnetic signal towards the soil and to receive return echoes, and an electronic processing unit for analyzing the data acquired by said antennas and for reconstructing an image of the subsoil portion scanned by the machine; said antennas being organized into groups including a first group of antennas for detecting transverse underground facilities and a second group of antennas for detecting longitudinal underground facilities; the method comprising the following steps:
   a) for each antenna, sending said electromagnetic signal towards the soil,
   b) detecting the return echoes of said signals at different scanning speeds within a predetermined range,
   c) for each antenna, automatically determining a speed of propagation for which the return echo is maximized,
   d) comparing said maximum values of the return echoes among each of the groups of the antennas.

10. The method according to claim 9, wherein the second group of antennas comprises at least two rows of antennas, wherein the antennas in each row have horizontal polarization, for detecting any underground facilities arranged longitudinally with respect to the direction of forward motion of the apparatus, and wherein the comparison of step d) takes place between the antennas of one row and the antennas of the next row.

11. The method according to claim 9, wherein after step d) the following steps are carried out in real time:
   e) verifying the presence of an underground facility,
   f) displaying said underground facility on the display in a georeferenced position.

12. The method according to claim 11, wherein the underground facility is displayed by a target having a predetermined color placed in the georeferenced position.

13. The method according to claim 12, wherein visualization takes place in real time with respect to the detection.

14. The method according to claim 9, wherein the apparatus performs a non-invasive excavation assay by a plurality of parallel longitudinal passes and an initial self-alignment algorithm, so as to carry out detections over a predetermined area without needing any mechanical supports.

15. A method of non-invasive subsoil inspection for verifying a presence of underground facilities through an apparatus comprising a mobile support structure movable in at least one horizontal direction and which supports a plurality of antennas for transmitting an electromagnetic signal towards the soil and to receive return echoes, and an electronic processing unit for analyzing data acquired by said antennas and for reconstructing an image of a subsoil portion scanned by the apparatus;
   the plurality of antennas comprising a group of antennas having at least two rows of antennas, wherein the antennas in each row have horizontal polarization, for detecting underground facilities arranged longitudinally with respect to the direction of forward motion of the apparatus;
   the method comprising the following steps:
   a) for each antenna, sending said electromagnetic signal towards the soil;
   b) detecting the return echoes of said signals at different scanning speeds within a predetermined range;
   c) for each antenna, automatically determining a speed of propagation for which the return echo is maximized; and
   d) comparing said maximum values of the return echoes among the antennas, wherein the comparing said maximum values of the return echoes takes place between the antennas of one row and the antennas of a next row.

* * * * *